(12) United States Patent
Theios et al.

(10) Patent No.: US 9,499,438 B2
(45) Date of Patent: Nov. 22, 2016

(54) WINDOW FOR ATTENUATING RF AND IR ELECTROMAGNETIC SIGNALS

(71) Applicant: Guardian Industries Corp., Auburn Hills, MI (US)

(72) Inventors: Jason E. Theios, Toledo, OH (US); John M. Mitchell, Northville, MI (US); Vijayen S. Veerasamy, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 683 days.

(21) Appl. No.: 13/779,879

(22) Filed: Feb. 28, 2013

(65) Prior Publication Data
US 2014/0237917 A1    Aug. 28, 2014

(51) Int. Cl.
| | | |
|---|---|---|
| *B32B 15/04* | (2006.01) | |
| *B32B 17/06* | (2006.01) | |
| *C03C 17/36* | (2006.01) | |
| *E06B 9/24* | (2006.01) | |
| *E06B 5/18* | (2006.01) | |
| *C03C 17/34* | (2006.01) | |

(52) U.S. Cl.
CPC ......... *C03C 17/366* (2013.01); *C03C 17/3411* (2013.01); *C03C 17/3417* (2013.01); *C03C 17/3435* (2013.01); *C03C 17/36* (2013.01); *C03C 17/3639* (2013.01); *C03C 17/3644* (2013.01); *C03C 17/3652* (2013.01); *C03C 17/3655* (2013.01); *C03C 17/3676* (2013.01); *C03C 17/3681* (2013.01); *E06B 5/18* (2013.01); *E06B 9/24* (2013.01); *C03C 2217/78* (2013.01); *C03C 2217/94* (2013.01); *C03C 2217/948* (2013.01); *C03C 2218/365* (2013.01)

(58) Field of Classification Search
USPC ....... 428/426, 428, 432, 688, 689, 699, 701, 428/702, 433, 434
See application file for complete search history.

(56) References Cited

U.S. PATENT DOCUMENTS

| | | | | |
|---|---|---|---|---|
| 3,974,316 | A * | 8/1976 | Jacquemin et al. | 428/215 |
| 4,306,140 | A * | 12/1981 | Stromquist | 219/522 |
| 4,613,530 | A * | 9/1986 | Hood et al. | 428/34 |
| 4,721,636 | A * | 1/1988 | Hood et al. | 428/38 |
| 5,852,284 | A * | 12/1998 | Teder et al. | 219/522 |
| 6,068,914 | A * | 5/2000 | Boire et al. | 428/216 |
| 6,144,017 | A * | 11/2000 | Millett et al. | 219/522 |
| 6,148,563 | A * | 11/2000 | Roche et al. | 49/501 |

(Continued)

OTHER PUBLICATIONS

Martin Holladay, Green Building Advisor, "All About Glazing Options", Dec. 3, 2010, http://www.greenbuildingadvisor.com/blogs/dept/musings/all-about-glazing-options.*

(Continued)

*Primary Examiner* — Lauren R Colgan
(74) *Attorney, Agent, or Firm* — Nixon & Vanderhye P.C.

(57) ABSTRACT

Windows for attenuating radio frequency (RF) and infrared (IR) electromagnetic signals, so as to prevent or reduce such signals from emanating from secure facilities (e.g., government and/or military facilities). Example embodiments relate to a window including at least first and second glass substrates, at least first and second low-emissivity (low-E) coatings for blocking at least some IR and RF signals, and at least one transparent conductive oxide (TCO) inclusive coating for blocking at least some RF signals. The TCO inclusive coating may include a layer of or including indium-tin-oxide (ITO) located between at least first and second dielectric layers.

25 Claims, 5 Drawing Sheets

(56) References Cited

U.S. PATENT DOCUMENTS

| | | | |
|---|---|---|---|
| 6,444,281 B1* | 9/2002 | Wang et al. | 428/34 |
| 7,246,470 B2* | 7/2007 | Beyrle | 52/171.1 |
| 7,700,901 B2* | 4/2010 | Busick et al. | 219/522 |
| 7,718,266 B2* | 5/2010 | Kriltz et al. | 428/426 |
| 7,728,260 B2* | 6/2010 | Johnson | 219/200 |
| 7,870,704 B2* | 1/2011 | Riblier et al. | 52/786.1 |
| 7,887,921 B2* | 2/2011 | Varanasi et al. | 428/432 |
| 7,968,823 B2* | 6/2011 | Gerhardinger | 219/213 |
| 8,097,342 B2* | 1/2012 | Thomsen et al. | 428/428 |
| 8,187,713 B2 | 5/2012 | Lemmer et al. | |
| 8,226,803 B2 | 7/2012 | Neuman et al. | |
| 8,281,617 B2 | 10/2012 | Ferreira et al. | |
| 8,293,344 B2 | 10/2012 | Lemmer et al. | |
| 8,304,045 B2* | 11/2012 | Lemmer et al. | 428/34 |
| 8,709,604 B2* | 4/2014 | Imran et al. | 428/432 |
| 8,941,788 B2* | 1/2015 | Brecht et al. | 349/16 |
| 8,968,878 B2* | 3/2015 | Imran et al. | 428/432 |
| 2002/0075552 A1* | 6/2002 | Poll et al. | 359/275 |
| 2003/0024180 A1* | 2/2003 | Hartig et al. | 52/204.5 |
| 2003/0113550 A1* | 6/2003 | Millett et al. | 428/432 |
| 2004/0253471 A1* | 12/2004 | Thiel et al. | 428/544 |
| 2005/0008796 A1* | 1/2005 | Kriltz et al. | 428/34 |
| 2006/0090834 A1* | 5/2006 | Huang et al. | 156/99 |
| 2006/0188730 A1* | 8/2006 | Varanasi et al. | 428/432 |
| 2007/0081228 A1* | 4/2007 | Hartig | 359/359 |
| 2007/0103763 A1* | 5/2007 | Poll et al. | 359/265 |
| 2007/0235441 A1* | 10/2007 | Winsler | 219/522 |
| 2007/0285819 A1* | 12/2007 | Gerhardinger | 360/48 |
| 2008/0160321 A1* | 7/2008 | Padiyath et al. | 428/432 |
| 2009/0047466 A1* | 2/2009 | German et al. | 428/98 |
| 2009/0135319 A1* | 5/2009 | Veerasamy | 349/16 |
| 2009/0205956 A1 | 8/2009 | Lu et al. | |
| 2009/0214880 A1 | 8/2009 | Lemmer | |
| 2009/0324858 A1* | 12/2009 | Jaeger | 428/34 |
| 2010/0075155 A1 | 3/2010 | Veerasamy | |
| 2010/0104840 A1 | 4/2010 | Blacker et al. | |
| 2010/0165436 A1* | 7/2010 | Voss et al. | 359/238 |
| 2010/0257782 A1* | 10/2010 | Giesen et al. | 47/17 |
| 2011/0210656 A1* | 9/2011 | Lemmer et al. | 312/405 |
| 2011/0212311 A1* | 9/2011 | Lemmer et al. | 428/212 |
| 2011/0300319 A1* | 12/2011 | Reymond et al. | 428/34 |
| 2012/0033287 A1* | 2/2012 | Friedman et al. | 359/275 |
| 2012/0090246 A1* | 4/2012 | Nunez-Regueiro et al. | 49/484.1 |
| 2012/0127578 A1* | 5/2012 | Bright et al. | 359/585 |
| 2012/0147449 A1* | 6/2012 | Bhatnagar et al. | 359/275 |
| 2012/0164420 A1* | 6/2012 | Lemmer et al. | 428/216 |
| 2012/0219821 A1 | 8/2012 | Frank et al. | |
| 2012/0225224 A1 | 9/2012 | Blacker et al. | |
| 2012/0225304 A1 | 9/2012 | Imran et al. | |
| 2012/0225316 A1 | 9/2012 | Imran et al. | |
| 2012/0225317 A1 | 9/2012 | Imran et al. | |
| 2013/0021659 A1* | 1/2013 | Friedman et al. | 359/275 |
| 2013/0022820 A1* | 1/2013 | Lemmer et al. | 428/428 |
| 2013/0236729 A1* | 9/2013 | Lemmer et al. | 428/446 |
| 2013/0278989 A1* | 10/2013 | Lam et al. | 359/275 |
| 2014/0153122 A1* | 6/2014 | Wang et al. | 359/853 |
| 2014/0237917 A1* | 8/2014 | Theios et al. | 52/203 |

OTHER PUBLICATIONS

Sunguard (http://www.eu.en.sunguardglass.com/cs /groups/sunguardeurope/documents/web_content/gi_007115.pdf), 2011.*
Twinseal (http://www.twinseal.co.uk/glazing-solutions-01a.php).*
U.S. Appl. No. 13/690,035, filed Nov. 30, 2012; Wang et al.
U.S. Appl. No. 13/690,133, filed Nov. 30, 2012; Nunez-Regueiro et al.

* cited by examiner

WINDOW FOR ATTENUATING RF AND IR ELECTROMAGNETIC SIGNALS

FIELD OF THE INVENTION

Certain example embodiments of this invention relate to windows for attenuating (e.g., blocking, such as reflecting and/or absorbing) radio frequency (RF) and infrared (IR) electromagnetic signals, so as to prevent or reduce such signals from emanating from secure facilities (e.g., government and/or military facilities). Example embodiments of this invention relate to a window including at least first and second glass substrates, at least first and second low-emissivity (low-E) coatings for blocking at least some IR and RF signals, and at least one transparent conductive oxide (TCO) inclusive coating for blocking at least some RF signals.

BACKGROUND AND SUMMARY OF EXAMPLE EMBODIMENTS OF THE INVENTION

The U.S. Department of State (DoS) has requested window glazings for secure facilities, to provide radio frequency (RF) and infrared (IR) attenuating glazing solutions in an attempt to prevent electromagnetic signals from emanating from secure government facilities in order to prevent eavesdropping and reduce the transmission of confidential information from the interiors of such buildings. The current approach to achieve this is either through the application of aftermarket window film products that incorporate proprietary materials to provide the required attenuation, or a monolithically laminated glazing having two substrates with a polyvinyl butyral (PVB) or SGP laminating interliner with mechanically deposited materials on surface #2 and surface #3 (i.e., on the surfaces of the substrates that face the interliner). Such approaches are costly, difficult to manufacture/implement, and sometimes provide for inadequate signal blockage.

In certain example embodiments of this invention, there is provided a window for attenuating (e.g., blocking, such as reflecting and/or absorbing) significant amounts of radio frequency (RF) and infrared (IR) electromagnetic signals, so as to prevent or reduce such signals from emanating from secure facilities (e.g., government and/or military facilities). Example embodiments of this invention provide for a window including at least first and second glass substrates, at least first and second low-emissivity (low-E) coatings for blocking at least some IR and RF signals, and at least one transparent conductive oxide (TCO) inclusive coating for blocking at least some RF signals. The TCO inclusive coating may include a layer of or including indium-tin-oxide (ITO) located between at least a first dielectric layer of or including silicon oxynitride and a second dielectric layer of or including silicon oxide, silicon nitride and/or silicon oxynitride. The TCO inclusive coating can be located on the innermost glass substrate so as to face the building interior, in order to improve RF/IR attenuation at least at a central area of the window. Moreover, the TCO inclusive coating is durable and does not require edge deletion. Thus, in embodiments where the low-E coating(s) is/are edge deleted (i.e., removed from the substrate proximate at least one edge thereof), but the RF blocking TCO inclusive coating is not edge deleted, the non-edge deleted TCO inclusive coating allows for electrical termination to a conductive window frame along all sides of the window in order to eliminate or reduce waveguide leakage of RF proximate the periphery of the window.

In certain example embodiments of this invention, there is provided a window structure comprising: first and second glass substrates that are laminated to each other via a polymer-based laminating layer; a first low-E coating on a first major surface of the first glass substrate; a second low-E coating on a first major surface of the second glass substrate, wherein the first and second low-E coatings face each other with no glass substrate therebetween; wherein each of the first and second low-E coatings comprises at least two IR reflecting layers comprising silver that are spaced apart from one another via at least one dielectric layer; an RF blocking coating on a second major surface of the second glass substrate for facing an interior of a building in which the window structure is to be mounted, and wherein the RF blocking coating comprises a transparent conductive layer comprising indium-tin-oxide (ITO) that is located between first and second dielectric layers; wherein the first low-E coating is edge deleted so that the first low-E coating is not present on the first major surface of the first glass substrate along an edge of the first glass substrate; wherein the second low-E coating is edge deleted so that the second low-E coating is not present on the first major surface of the second glass substrate along an edge of the second glass substrate; and wherein the RF blocking coating is not edge deleted, so that the RF blocking coating is present across the entire second major surface of the second glass substrate.

In certain example embodiments of this invention, there is provided a window structure comprising: first and second glass substrates that are laminated to each other via a polymer-based laminating layer; a first low-E coating on a first major surface of the first glass substrate, so that the first low-E coating faces the second glass substrate with no glass substrate therebetween, and wherein the first low-E coating comprises at least two IR reflecting layers comprising silver that are spaced apart from one another via at least one dielectric layer; an RF blocking coating facing an interior of a building in which the window structure is mounted, and wherein the RF blocking coating comprises a transparent conductive oxide layer that is located between first and second dielectric layers; wherein the first low-E coating is edge deleted so that the first low-E coating is not present on the first major surface of the first glass substrate along at least one edge of the first glass substrate; and wherein the RF blocking coating is not edge deleted.

DETAILED DESCRIPTION OF EXAMPLE EMBODIMENTS OF THE INVENTION

Referring now more particularly to the drawings in which like reference numbers indicate like parts/elements throughout the several views.

In certain example embodiments of this invention, there is provided a window structure 100, including a window frame 200 and a window 300 located in the window frame 200, for attenuating (e.g., blocking, such as reflecting and/or absorbing) significant amounts of radio frequency (RF) and infrared (IR) electromagnetic signals, so as to prevent or reduce such signals from emanating from secure facilities (e.g., government and/or military facilities). Example embodiments of this invention provide for a window including glass substrates (1, 3, 5, 7), low-emissivity (low-E) coatings (11a, 11b) for blocking at least some IR and RF signals, and at least one transparent conductive oxide (TCO) inclusive coating 9 for blocking at least some RF signals. The TCO inclusive coating 9 may include a layer of or including indium-tin-oxide (ITO) 20 located between at least a first dielectric layer 23 of or including silicon oxynitride and a second dielectric layer 25 of or including silicon oxide, silicon nitride and/or silicon oxynitride. The TCO inclusive coating 9 can be located on the innermost glass substrate (e.g., on substrate 3 in the FIG. 1 embodiment) so as to face the building interior ("inside"), in order to improve RF/IR attenuation at least at a central area of the window. Moreover, the TCO inclusive coating 9 is durable and does not require edge deletion. Thus, in embodiments where the low-E coatings 11a, 11b are edge deleted as shown at 2 (removed from the substrate proximate one, two, or all edges thereof), but the RF blocking TCO inclusive coating 9 is not edge deleted, the non-edge deleted TCO inclusive coating 9 allows for electrical termination to conductive window frame 200 along all four sides of the window in order to eliminate or reduce waveguide leakage of RF proximate the periphery of the window.

Figure 1:
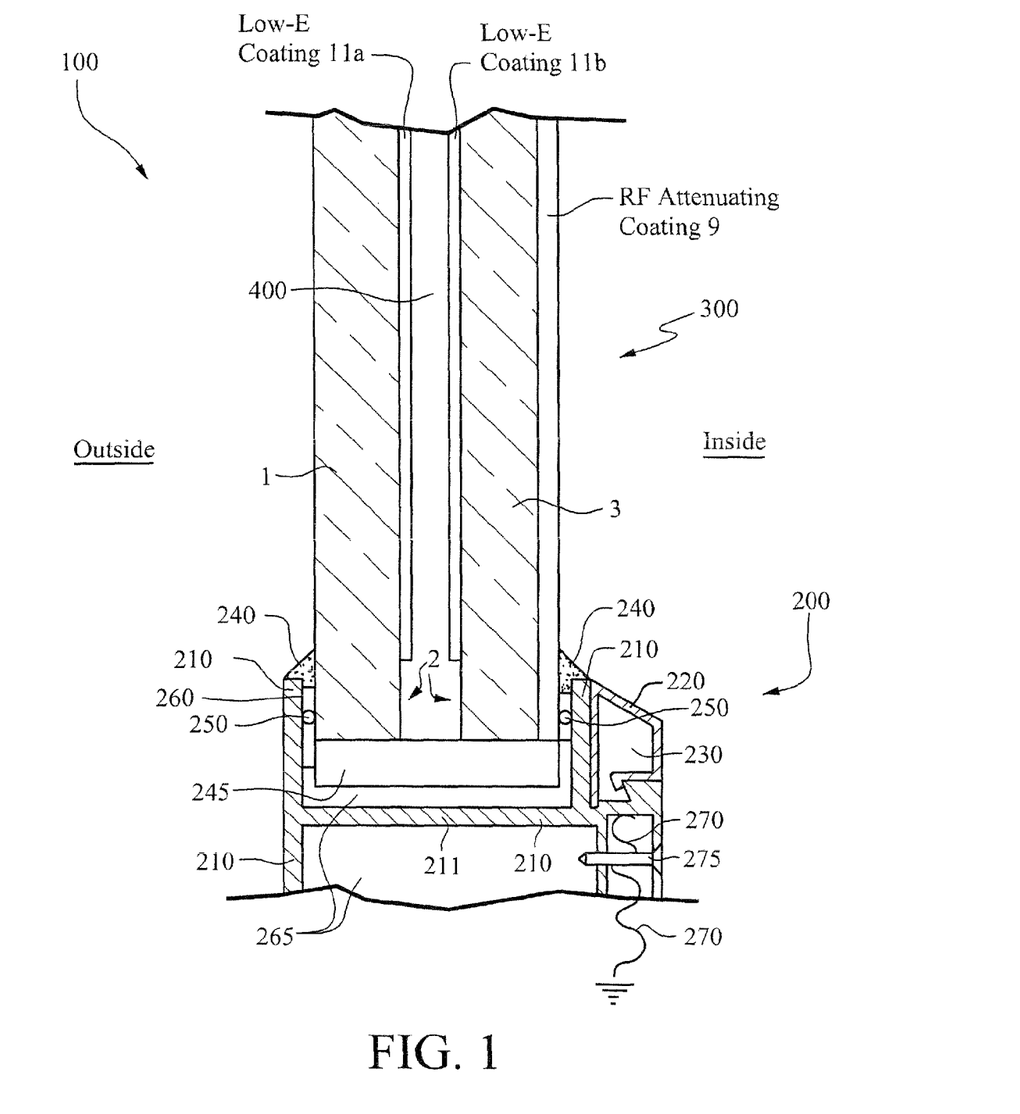
FIG. 1 is a cross sectional view illustrating a window according to an example embodiment of this invention.
Figure 2:
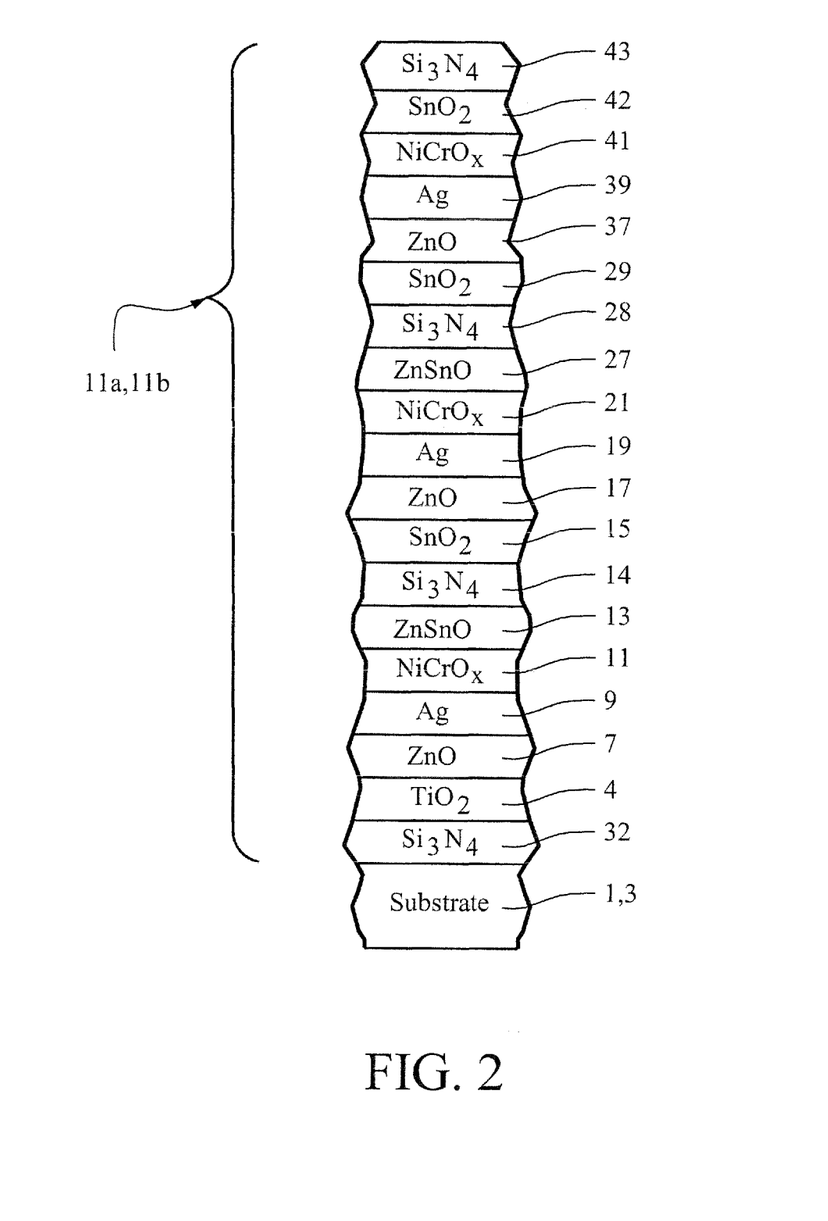
FIG. 2 is a cross sectional view illustrating an example low-E coating that may be used in the window of any of FIGS. 1, 4 and/or 5.

FIG. 1 illustrates a window structure 100 including window 300 provided in window frame 200. The window 300 in the FIG. 1 embodiment is a monolithic laminated window including outer glass substrate 1 proximate the exterior of the building ("outside), inner glass substrate 3 proximate the building interior, and laminating layer 400 (e.g., of or including PVB, EVA, SOP, or the like) which laminates the two glass substrates to each other. In certain example embodiments, each of glass substrates 1, 3 and laminating layer 400 are substantially transparent, and may have a visible transmission of at least about 30%, more preferably of at least about 40%, and even more preferably of at least about 50%, and most preferably of at least about 60%. Similarly, the window 300 preferably has a visible transmission of at least about 30%, more preferably of at least about 40%, even more preferably of at least about 50%, and most preferably of at least about 60% in example embodiments of this invention. Low-E coatings 11a and 11b are substantially transparent to visible light and are provided on glass substrates 1 and 3, respectively, as shown in FIG. 1 so as to each face the laminating layer 400. In certain example embodiments, each of the low-E coatings includes at least three IR reflecting layers of or including silver as shown for example in FIG. 2. Low-E coatings 11a and 11b may or may not have the same coating stack in various embodiments. Thus, the same coating stack may or may not be used for both coatings 11a and 11b in different embodiments of this invention. An example low-E coating, having three silver based IR reflecting layers, that may be used for coating 11a and/or coating 11b is shown in FIG. 2. RF blocking TCO inclusive coating 9 is transparent to visible light and is provided on the side of inner glass substrate 3 facing the building interior, as shown in FIG. 1. As shown in FIG. 1, RF blocking TCO inclusive coating 9 is not edge deleted and extends across the entire major surface of substrate 3 that faces the building interior, whereas low-E coatings 11a and 11b are edge deleted and thus have been removed from peripheral portions of the substrates 1 and 3 as shown at 2 so that coatings 11a and 11b do not extend across the entire major surfaces of substrate 1 and 3. Optionally, although not shown in FIG. 1, another RF blocking coating 9 may be provided on the exterior major surface of glass substrate 1 that faces the outside environment. Glass substrate 1, glass substrate 3 and/or glass substrate 5 (with coatings thereon) may or may not be heat treated (e.g., thermally tempered).

Still referring to FIG. 1, the window frame 200, which supports the window 300, includes conductive metallic window frame member 210, trim 220 which may be metallic or of other suitable material and which may at least partially surround insulating foam 230, sealing gaskets 240 of or including rubber and/or silicone, setting block 245 of rubber or the like, and pre-shim conductive spacers 250 that allow conductive RF blocking coating 9 to be electrically connected to conductive metallic frame 210 on at least one side of the window. In certain example embodiments, sealing gasket(s) 240 and/or spacers 250 is/are electrically conductive so as to conductively connect the conductive frame 210 to conductive coating 9 which is on one or both of the glass substrates. Spacer 250 could be replaced with any other suitable conductive material of any suitable shape. A plurality of conductive spacers 250 may be provided on each side of the window, and may be embedded in insulating material 260 in certain example embodiments. Air gaps 265 may be provided on either side of cross member 211 of the frame member 210. Conductive member 270, electrically connected to ground, may be attached to the conductive window frame member 210 via conductive screw 275 or the like, with conductive member 270 helping form a faraday cage or quasi-faraday cage in the wall of the building in which the window structure is mounted. The metal frame member 210 tends to block significant amounts of IR. A weep hole (not shown) may be provided in cross member 211 to allow condensation and/or liquid to drain from the air gap 265 under the block 245. The glass substrates (e.g., 1 and 3) are rectangular in shape as viewed in plan view, and the window frame (including metallic frame member 210, trim member 220, foam 230, sealing gaskets 240, and setting block 245) is provided around all four edges of the window and thus around all four peripheral edges of the glass substrates that are provided in the window. The non-edge deleted RF blocking TCO inclusive coating 9 allows for electrical termination to conductive window frame member 210 along all four sides of the window, via conductive spacers 250, in order to eliminate or reduce waveguide leakage of RF proximate the periphery of the window. The addition of the TCO inclusive conductive coating 9 to the interior surface of the window 300 improves RF attenuation across the entire surface of window 300. Because it is an interior surface coating that does not require edge deletion, is also provides electrical termination to the window frame around all sides of the window (e.g., via at least conductive spacers 250) thereby eliminating and/or reducing RF waveguide leakage around the periphery of the window. Transparent conductive coating 9 is provided on the glass substrate 3 and provides substantially the same durability as that of glass, and reduces the potential for unintentional ablation of the coating 9.

The window of FIG. 1 is excellent at blocking both IR and RF signals from leaving the interior of the building in which the window is mounted. For example, the window has a % transmission at 800 nm of less than about 2.5%, more preferably less than about 2.0%, and most preferably less than about 1%. For example, when the coatings shown in FIGS. 2-3 are used in the FIG. 1 embodiment as shown in FIG. 1, the window has a % transmission at 800 nm near the center of the window of about 0.25%.

Figure 3:
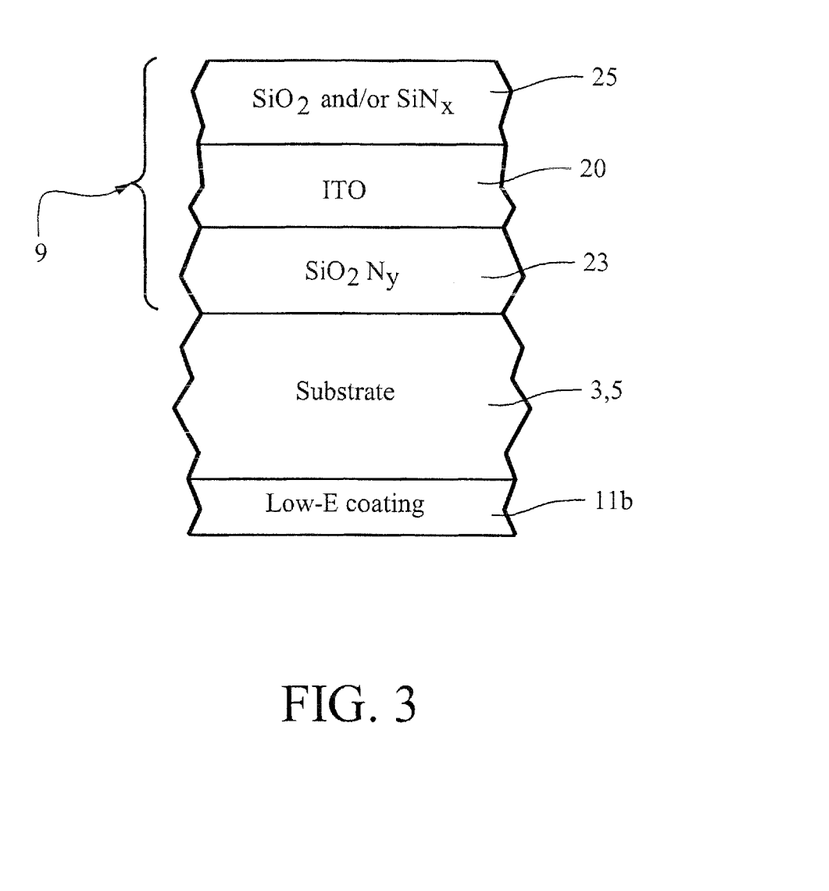
FIG. 3 is a cross sectional view illustrating an example TCO inclusive coating that may be used in the window of any of FIGS. 1, 4 and/or 5.
Figure 4:
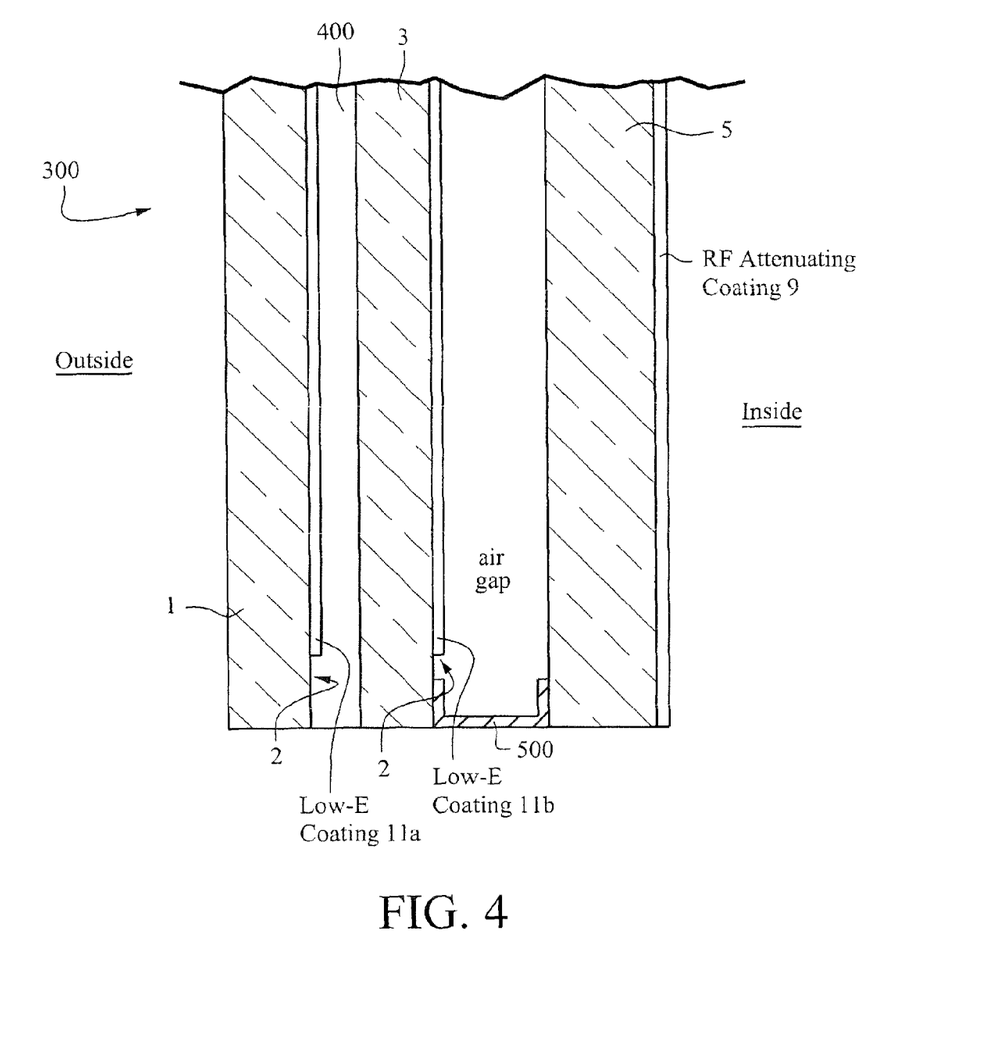
FIG. 4 is a cross sectional view illustrating a window that may be provided in the window frame of FIG. 1 according to another example embodiment of this invention.
Figure 5:
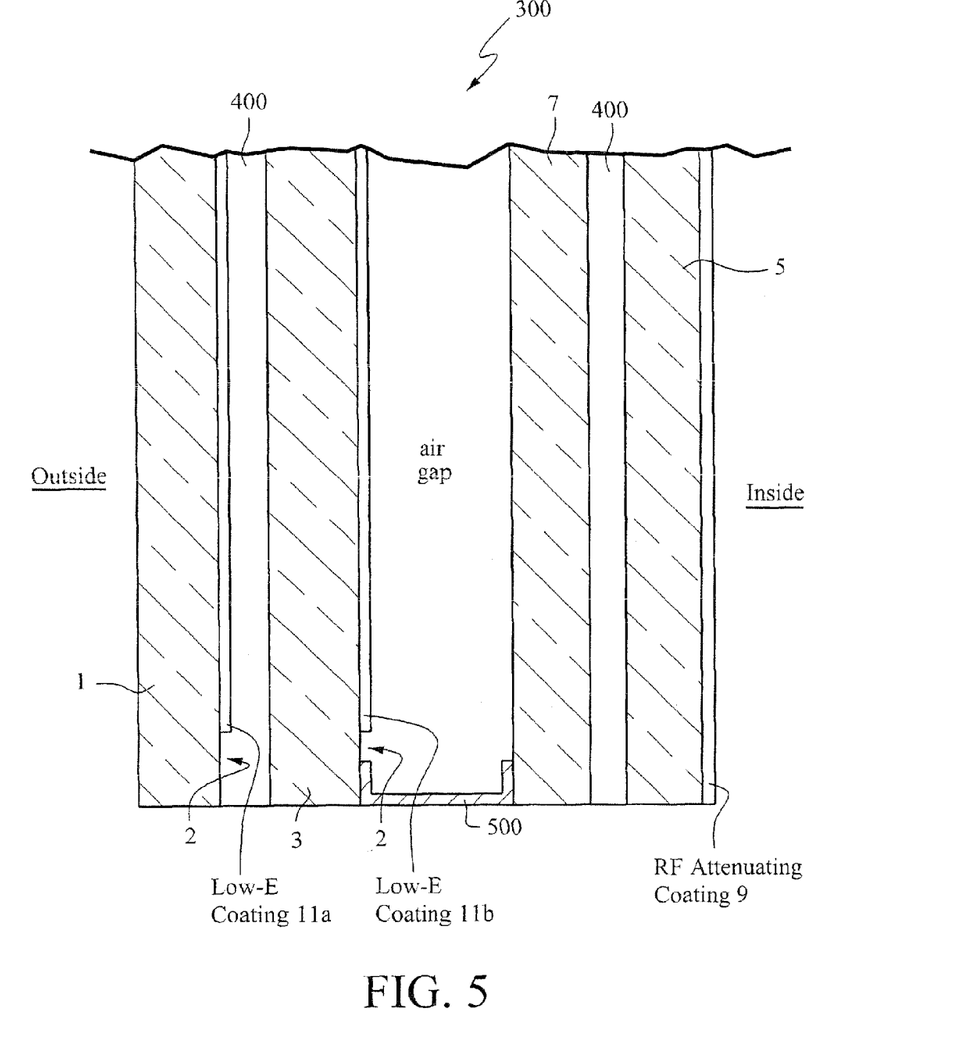
FIG. 5 is a cross sectional view illustrating a window that may be provided in the window frame of FIG. 1 according to another example embodiment of this invention.

An example transparent conductive RF blocking coating 9, that may be used in any of the embodiments or FIG. 1, 4 or 5, is shown in FIG. 3 and is discussed below. FIG. 3 is a cross sectional view of an example coating 9. The coating 9 may be deposited via sputter deposition in example embodiments. In the illustrated embodiment, transparent dielectric layer 23 adjacent the glass substrate (3 or 5) is of or includes silicon oxynitride, transparent conductive RF reflecting layer 20 is a transparent conductive oxide (TCO) such as being of or including indium-tin-oxide (ITO), and transparent dielectric layer 25 is of or includes silicon oxide (e.g., $SiO_2$), silicon nitride, and/or silicon oxynitride. Any silicon nitride or silicon oxynitride inclusive layer (e.g., layer 23 and/or 25) herein may optionally be doped with a metal such as aluminum in certain example embodiments. For example, silicon oxynitride layer 23 may be doped with from about 0.5-10% aluminum, more preferably from about 2-6% aluminum (atomic % for all such percentages herein) in example embodiments. Optionally, a layer of or including zirconium oxide (not shown) may be provided over the layer 25 of coating 9.

Coating 9 may function as both an RF blocking coating and an antireflective (AR) coating. Silicon oxide layer 25 preferably has an index of refraction (n) of from about 1.5 to 1.8, more preferably from about 1.5 to 1.6, in example embodiments of this invention. Silicon oxynitride layer 23 preferably has an index of refraction (n) of from about 1.65 to 1.85, more preferably from about 1.65 to 1.75, in example embodiments of this invention. And ITO inclusive layer 20 preferably has a higher index of refraction than layers 23 and 25, in providing for an AR type layer structure for the coating 9. ITO layer 20 preferably has an index of refraction (n) at least about 0.2 or 0.1 higher than layer 23 and/or 25. In example embodiments, ITO layer 20 has an index of refraction (n) of from about 1.8 to 2.0, more preferably from about 1.85 to 1.95, with an example index being about 1.9. The refractive index ranges herein (measured at wavelength of 450 nm) of the layers shown in FIG. 3 allow the coating 9 to function as an AR coating (in addition to having RF blocking properties), and in example embodiments a coating 9 reduces visible reflection by approximately 2.5 to 4.0% (e.g., about 3.2%) per side/application. In example embodiments of this invention, silicon oxynitride inclusive layer 23 is from about 10-150 nm thick, more preferably from about 10-100 nm thick, more preferably from about 20-60 nm thick, and even more preferably from about 30-50 nm thick. In example embodiments of this invention, silicon oxide and/or silicon nitride inclusive layer 25 may be doped with small amounts of other material (e.g., nitrogen and/or aluminum) and is from about 10-200 nm thick, more preferably from about 40-140 nm thick, and even more preferably from about 70-110 nm thick, with an example being about 90 nm thick. In example embodiments of this invention, transparent conductive ITO inclusive layer 20 of coating 9 is fairly thick to provide RF blocking and low sheet resistance, while being thin enough to still allow visible transmission therethrough for purposes of serving in a window. In example embodiments, ITO based layer 20 is from about 60-220 nm thick, more preferably from about 75-180 nm thick, even more preferably from about 90-130 nm thick, and most preferably from about 100-120 nm thick (e.g., about 90 nm thick). Thus, in example embodiments, ITO layer 20 has a low sheet resistance and can block significant amounts of RF, while maintaining visible transmission of at least about 30%, 40%, 50%, or even at least about 60%. Optionally, layer 23 may be of silicon nitride (e.g., $Si_3N_4$), which may be doped with small amounts of aluminum and/or oxygen, and may have the same thickness ranges discussed above in connection with layer 23. And optionally, other non-illustrated layers may also be included in the coating 9. For example, a layer of or including titanium oxide and a layer of or including silicon nitride may be provide between the supporting glass substrate and layer 23, with the silicon nitride layer being closest to the glass substrate. Also, as shown in FIG. 3, it is possible that a low-E coating 11b may be provided on the substrate (3 or 5) on the major surface thereof opposite to the major surface on which the coating 9 is provided.

TABLE 1

(Example Materials/Thicknesses for RF blocking coating 9)

| Layer | Range (nm) | More Preferred (nm) | Example (nm) |
|---|---|---|---|
| $SiO_xN_y$ (23) | 10-100 nm | 20-60 nm | 30-50 nm |
| ITO (20) | 60-220 nm | 75-180 nm | 90-130 nm |
| $SiO_x$/SiN (25) | 10-200 nm | 40-140 nm | 70-110 nm |

Silver-based low-E coatings 11a and 11b may be, for example, any suitable low-E coating having one, two, three or four silver-based IR reflecting layers physically separated from each other via dielectric layer(s) in example embodiments of this invention. Low-E coatings 11a and 11b may be, for example, any of the low-E coatings described in one or more of U.S. Patent Document Nos. 2012/0219821, 2012/0225304, 2012/0225224, 2012/0090246, 2009/0214880; 2009/0205956; 2009/0324934, 2010/0075155; 2010/0104840, U.S. Pat. Nos. 8,226,803, 8,187,713, 8,281, 617, Ser. Nos. 12/453,125, and 12/662,561, the entire contents of which are all hereby incorporated herein by reference. Another example low-E coating that may be used for coating 11a and/or 11b is illustrated in FIG. 2 and is charted as follows with the layers being identified moving away from the supporting glass substrate 1 or 3.

TABLE 2

Example materials/thicknesses - Low-E coating(s) 11a and/or 11b

| Layer Glass (1-10 mm thick) | Preferred Range (Å) | More Preferred (Å) | Example (Å) |
|---|---|---|---|
| $Si_xN_y$ (layer 32) | 40-250 Å | 125-175 Å | 154 Å |
| $TiO_x$ (layer 4) | 40-400 Å | 50-200 Å | 140 Å |
| $ZnO_x$ (layer 7) | 50-170 Å | 50-85 Å | 60 Å |
| Ag (layer 9) | 80-150 Å | 100-130 Å | 113 Å |
| $NiCrO_x$ (layer 11) | 12-35 Å | 20-30 Å | 25 Å |
| ZnSnO (layer 13) | 0-1,000 Å | 200-550 Å | 388 Å |
| $Si_xN_y$ (layer 14) | 50-250 Å | 60-140 Å | 100 Å |
| $SnO_2$ (layer 15) | 30-250 Å | 100-200 Å | 150 Å |
| $ZnO_x$ (layer 17) | 50-180 Å | 60-110 Å | 80 Å |
| Ag (layer 19) | 80-160 Å | 100-135 Å | 115 Å |
| $NiCrO_x$ (layer 21) | 12-35 Å | 20-30 Å | 25 Å |
| ZnSnO (layer 27) | 0-1,000 Å | 200-600 Å | 400 Å |
| $Si_xN_y$ (layer 28) | 50-450 Å | 70-120 Å | 150 Å |
| $SnO_2$ (layer 29) | 50-250 Å | 50-200 Å | 180 Å |
| $ZnO_x$ (layer 37) | 50-180 Å | 60-110 Å | 80 Å |
| Ag (layer 39) | 110-200 Å | 120-165 Å | 145 Å |
| $NiCrO_x$ (layer 41) | 12-35 Å | 20-30 Å | 25 Å |
| $SnO_2$ (layer 42) | 0-750 Å | 100-220 Å | 170 Å |
| $Si_3N_4$ (layer 43) | 0-750 Å | 110-350 Å | 219 Å |

When the low-E coating shown in FIG. 2 is used as coating 11a and/or coating 11b, it can be seen that the uppermost silver-based IR reflecting layer 39 may be significantly thicker than the two other silver-based IR reflecting layers 9 and 19 (e.g., at least ten angstroms thicker, and most preferably at least 20 or 25 angstroms thicker). Moreover, the silicon nitride layers may or may not be doped with other materials such as aluminum as discussed above. And some of the layers of the FIG. 2 coating may be removed, or may be replaced with layers of other material(s). And it is also possible to locate other non-illustrated layers in the stack of FIG. 2, such as between illustrated layers.

FIG. 4 is a cross sectional view illustrating another window 300 that may be provided in the window frame 200 of FIG. 1 according to another example embodiment of this invention. The window shown in FIG. 4 is an insulated glass (IG) window unit having a laminated outboard unit. The laminated outboard unit is made up of glass substrates 1 and 3 that are laminated to each other via laminating layer 400 (e.g., of or including PVB, EVA, SUP, or the like). The laminated outboard unit includes at least one low-E coating, including the low-E coating 11a shown in FIG. 4 provided on the major surface of glass substrate 1 facing the laminating layer 400. Another low-F coating 11b may be provided on the major surface of glass substrate 3 that faces the air gap provided between glass substrates 3 and 5, as shown in FIG. 4. Optionally, another low-E coating (not shown), having the same or different low-E stack as coatings 11a and/or 11b, may be provided on the major surface of substrate 5 facing the air gap between the substrate 5 and the laminated outboard unit. The laminated outboard unit is coupled to innermost glass substrate 5 via spacer 500, so that an air gap (that may be filled with gas such as argon or krypton) is located between the substrates 3 and 5. An RF blocking coating 9 is located on the major surface of substrate 5 that faces the building interior. As with the FIG. 1 embodiment, the low-E coatings 11a and 11b are edge deleted (see 2), whereas the RF blocking coating 9 is not edge deleted. Optionally, another RE blocking coating 9 may be provided on the major surface of substrate 1 facing the building exterior.

FIG. 5 is a cross sectional view illustrating another window 300 that may be provided in the window frame 200 of FIG. 1 according to another example embodiment of this invention. The window shown in FIG. 5 is an insulated glass (IG) window unit having a laminated outboard unit and a laminated inboard unit. The laminated outboard unit is made up of glass substrates 1 and 3 that are laminated to each other via laminating layer 400 (e.g., of or including PVB, EVA, SGP, or the like). The laminated outboard unit includes at least one low-E coating, including the low-E coating 11a shown in FIG. 5 provided on the major surface of glass substrate 1 facing the outermost laminating layer 400 and also possibly including low-E coating 11b shown in FIG. 5. The laminated inboard unit includes glass substrates 5 and 7 that are laminated to each other via a similar laminating layer 400, and the inboard laminated unit may or may not include at least one low-E coating. For example, another low-E coating (similar to 11a and/or 11b) may be provided on the major surface of glass substrate 7 that faces the air gap provided between glass substrates 3 and 7, and/or another low-E coating may be provided on the major surface of substrate 7 that faces substrate 5. The laminated outboard unit is coupled to the laminated inboard unit via spacer(s) 500, so that an air gap (that may be filled with gas such as argon) is located between the substrates 3 and 7 as shown in FIG. 5. An RF blocking coating 9 is located on the major surface of substrate 5 that faces the building interior. As with the FIG. 1 embodiment, the low-E coatings are edge deleted (see 2), whereas the RF blocking coating 9 is not edge deleted. Optionally, another RF blocking coating 9 may be provided on the major surface of substrate 1 facing the building exterior.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In example embodiments of this invention, there is provided a window structure comprising: first and second glass substrates that are laminated to each other via a polymer-based laminating layer; a first low-E coating on a first major surface of the first glass substrate; a second low-E coating on a first major surface of the second glass substrate, wherein the first and second low-E coatings face each other with no glass substrate therebetween; wherein each of the first and second low-E coatings comprises at least two IR reflecting layers comprising silver that are spaced apart from one another via at least one dielectric layer; an RF blocking coating on a second major surface of the second glass substrate for facing an interior of a building in which the window structure is to be mounted, and wherein the RF blocking coating comprises a transparent conductive layer comprising indium-tin-oxide (ITO) that is located between first and second dielectric layers; wherein the first low-E coating is edge deleted so that the first low-E coating is not present on the first major surface of the first glass substrate along an edge of the first glass substrate; wherein the second low-E coating is edge deleted so that the second low-E coating is not present on the first major surface of the second glass substrate along an edge of the second glass substrate; and wherein the RF blocking coating is not edge deleted, so that the RF blocking coating is present across the entire second major surface of the second glass substrate.

In the window structure of the immediately preceding paragraph, the first and second glass substrates may be rectangular in shape. The first low-E coating may be edge deleted so that the first low-E coating is not present on the first major surface of the first glass substrate along one, two, three, or all four edges of the first glass substrate, and the second low-E coating may be edge deleted so that the second low-E coating is not present on the first major surface of the second glass substrate along one, two, three or all four edges of the second glass substrate.

In the window structure of any of the preceding two paragraphs, the polymer based laminating layer may comprise PVB.

The window structure of any of the preceding three paragraphs may further comprise a conductive window frame member in which the first and second substrates are mounted, wherein the RF blocking coating is in electrical communication with the conductive window frame member. The RF blocking coating may be in electrical communication with the conductive window frame member via a plurality of conductive spacers.

In the window structure of any of the preceding four paragraphs, a central area of the window structure may have a visible transmission of at least about 30%, more preferably of at least about 40%, and possibly at least about 50%.

In the window structure of any of the preceding five paragraphs, the RF blocking coating may further comprise a dielectric layer comprising silicon oxynitride, and wherein the layer comprising silicon oxynitride may be located between the layer comprising ITO and the second glass substrate. The RF blocking coating may comprise first and second silicon inclusive dielectric layers, and wherein the layer comprising ITO is located between at least the first and second silicon inclusive dielectric layers. The RF blocking coating may comprise, in addition to the layer of or including ITO, a layer comprising silicon oxynitride and a layer comprising silicon oxide and/or silicon nitride, and wherein the layer comprising ITO may be located between and directly contacting the layer comprising silicon oxynitride and the layer comprising silicon oxide and/or silicon nitride.

In the window structure of any of the preceding six paragraphs, one or both of the first and second low-E coatings may comprise at least three IR reflecting layers comprising silver.

In example embodiments of this invention, there is provided a window structure comprising: first and second glass substrates that are laminated to each other via a polymer-based laminating layer; a first low-E coating on a first major surface of the first glass substrate, so that the first low-E coating faces the second glass substrate with no glass substrate therebetween, and wherein the first low-E coating comprises at least two IR reflecting layers comprising silver that are spaced apart from one another via at least one dielectric layer; an RF blocking coating facing an interior of a building in which the window structure is mounted, and wherein the RF blocking coating comprises a transparent conductive oxide layer that is located between first and second dielectric layers; wherein the first low-E coating is edge deleted so that the first low-E coating is not present on the first major surface of the first glass substrate along at least one edge of the first glass substrate; and wherein the RE blocking coating is not edge deleted.

In the window structure of the immediately preceding paragraph, the first and second glass substrates may be rectangular in shape and the first low-E coating may be edge deleted so that the first low-E coating is not present on the first major surface of the first glass substrate along one, two, three, or all four edges of the first glass substrate.

In the window structure of any of the preceding two paragraphs, the polymer based laminating layer may comprise PVB.

The window structure of any of the preceding three paragraphs may further comprise a conductive window frame member in which at least the first and second substrates are mounted, and wherein the RF blocking coating is in electrical communication with the conductive window frame member. The RF blocking coating may be in electrical communication with the conductive window frame member via a plurality of conductive spacers.

In the window structure of any of the preceding four paragraphs, a central area of the window structure may have a visible transmission of at least about 30%, more preferably of at least about 40%, and even more preferably of at least about 50%.

In the window structure of any of the preceding five paragraphs, the transparent conductive oxide may be ITO. The layer comprising ITO may be located between and contacting a layer comprising silicon oxynitride and a silicon inclusive dielectric layer such as silicon oxide, silicon nitride, and/or silicon oxynitride.

In the window structure of any of the preceding six paragraphs, (a) the RF blocking coating may be on a major surface of the second glass substrate, or (b) there may be a third glass substrate, and the RF blocking coating may be on a major surface of the third glass substrate. An air gap may be provided between the third glass substrate and the second glass substrate, and the second and third glass substrates may be spaced apart from one another via at least one spacer. Or the window structure may further comprise third and fourth glass substrates that are laminated to each other via another polymer-based laminating layer, and wherein the third glass substrate may be located between the fourth glass substrate and the second glass substrate, and wherein the RF blocking coating may be on a major surface of the fourth glass substrate. The second and third glass substrates may be spaced apart from one another via at least one spacer, and wherein an air gap may be provided between the second and third glass substrates.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A window structure comprising:
   first and second glass substrates that are laminated to each other via a polymer-based laminating layer so that no air gap is provided between the first and second glass substrates of the window structure;
   a first low-E coating on a first major surface of the first glass substrate;
   a second low-E coating on a first major surface of the second glass substrate, wherein the first and second low-E coatings face each other with no glass substrate therebetween;
   wherein each of the first and second low-E coatings comprises at least two IR reflecting layers comprising silver that are spaced apart from one another via at least one dielectric layer;
   a sputter-deposited RF blocking coating on a second major surface of the second glass substrate for facing an interior of a building in which the window structure is to be mounted, and wherein the RF blocking coating comprises a transparent conductive layer comprising indium-tin-oxide (ITO) that is located between first and second dielectric layers;
   wherein the first low-E coating is edge deleted so that the first low-E coating is not present on the first major surface of the first glass substrate along an edge of the first glass substrate;
   wherein the second low-E coating is edge deleted so that the second low-E coating is not present on the first major surface of the second glass substrate along an edge of the second glass substrate; and
   wherein the RF blocking coating is not edge deleted, so that the RF blocking coating is present across the entire second major surface of the second glass substrate.

2. The window structure of claim 1, wherein the first and second glass substrates are rectangular in shape and wherein: the first low-E coating is edge deleted so that the first low-E coating is not present on the first major surface of the first glass substrate along all four edges of the first glass substrate, and the second low-E coating is edge deleted so that the second low-E coating is not present on the first major surface of the second glass substrate along all four edges of the second glass substrate.

3. The window structure of claim 1, wherein the polymer based laminating layer comprises PVB.

4. The window structure of claim 1, further comprising a conductive window frame member in which the first and second substrates are mounted, and wherein the RF blocking coating is in electrical communication with the conductive window frame member.

5. The window structure of claim 4, wherein the RF blocking coating is in electrical communication with the conductive window frame member via a plurality of conductive spacers.

6. The window structure of claim 1, wherein a central area of the window structure has a visible transmission of at least about 30%.

7. The window structure of claim 1, wherein a central area of the window structure has a visible transmission of at least about 50%.

8. The window structure of claim 1, where the RF blocking coating further comprises a dielectric layer comprising silicon oxynitride, and wherein the layer comprising silicon oxynitride is located between the layer comprising ITO and the second glass substrate.

9. The window structure of claim 1, wherein the RF blocking coating further comprises first and second silicon inclusive dielectric layers, and wherein the layer comprising ITO is located between the first and second silicon inclusive dielectric layers.

10. The window structure of claim 1, wherein the RF blocking coating further comprises (a) a layer comprising silicon oxynitride and (b) a layer comprising silicon oxide and/or silicon nitride, and wherein the layer comprising ITO is located between and directly contacting the layer comprising silicon oxynitride and the layer comprising silicon oxide and/or silicon nitride.

11. The window structure of claim 1, wherein at least one of the first and second low-E coatings comprises at least three IR reflecting layers comprising silver.

12. The window structure of claim 1, wherein each of the first and second low-E coatings comprises at least three IR reflecting layers comprising silver.

13. A window structure comprising:
first and second glass substrates that are laminated to each other via a polymer-based laminating layer, wherein the polymer based laminating layer is provided across a viewing area of the window structure so that no air gap is provided between the first and second glass substrates;
a first low-E coating on a first major surface of the first glass substrate, so that the first low-E coating faces the second glass substrate with no glass substrate therebetween, and wherein the first low-E coating comprises at least two IR reflecting layers comprising silver that are spaced apart from one another via at least one dielectric layer;
a sputter-deposited RF blocking coating facing an interior of a building in which the window structure is mounted, and wherein the RF blocking coating comprises a transparent conductive oxide layer that is located between first and second dielectric layers;
wherein the first low-E coating is edge deleted so that the first low-E coating is not present on the first major surface of the first glass substrate along at least one edge of the first glass substrate; and
wherein the RF blocking coating is not edge deleted.

14. The window structure of claim 13, wherein the first and second glass substrates are rectangular in shape and wherein the first low-E coating is edge deleted so that the first low-E coating is not present on the first major surface of the first glass substrate along all four edges of the first glass substrate.

15. The window structure of claim 13, wherein the polymer based laminating layer comprises PVB.

16. The window structure of claim 13, further comprising a conductive window frame member in which the first and second substrates are mounted, and wherein the RF blocking coating is in electrical communication with the conductive window frame member.

17. The window structure of claim 16, wherein the RF blocking coating is in electrical communication with the conductive window frame member via a plurality of conductive spacers.

18. The window structure of claim 13, wherein a central area of the window structure has a visible transmission of at least about 30%.

19. The window structure of claim 13, where the transparent conductive oxide is ITO, and wherein the layer comprising ITO is located between and contacting a layer comprising silicon oxynitride and a silicon inclusive dielectric layer.

20. The window structure of claim 13, wherein the RF blocking coating is on a major surface of the second glass substrate.

21. The window structure of claim 13, further comprising a third glass substrate, and wherein the RF blocking coating is on a major surface of the third glass substrate.

22. The window structure of claim 21, wherein an air gap is provided between the third glass substrate and the second glass substrate, and wherein the second and third glass substrates are spaced apart from one another via at least one spacer.

23. The window structure of claim 13, further comprising third and fourth glass substrates that are laminated to each other via another polymer-based laminating layer, and wherein the third glass substrate is located between the fourth glass substrate and the second glass substrate, and wherein the RF blocking coating is on a major surface of the fourth glass substrate.

24. The window structure of claim 23, wherein the second and third glass substrates are spaced apart from one another via at least one spacer, and wherein an air gap is provided between the second and third glass substrates.

25. The window structure of claim 24, wherein argon gas is provided in the air gap.

* * * * *